(12) United States Patent
Allen et al.

(10) Patent No.: US 9,834,692 B1
(45) Date of Patent: Dec. 5, 2017

(54) LOW TEMPERATURE MILLING OF INKS FOR IMPROVED PROPERTIES

(71) Applicant: XEROX Corporation, Norwalk, CT (US)

(72) Inventors: C. Geoffrey Allen, Waterdown (CA); Aurelian Valeriu Magdalinis, Newmarket (CA); Carolyn Moorlag, Mississauga (CA); Milhaela Maria Birau, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/202,602

(22) Filed: Jul. 6, 2016

(51) Int. Cl.
- *C08F 2/46* (2006.01)
- *C08F 2/50* (2006.01)
- *C08G 61/04* (2006.01)
- *C09D 11/107* (2014.01)
- *C09D 11/101* (2014.01)

(52) U.S. Cl.
CPC .......... *C09D 11/107* (2013.01); *C09D 11/101* (2013.01)

(58) Field of Classification Search
CPC ............... C08F 2/50; C08F 2/46; C08G 61/04
USPC .................... 522/83, 71, 189, 184, 1; 520/1
See application file for complete search history.

(56) References Cited

U.S. PATENT DOCUMENTS

| | | | |
|---|---|---|---|
| 6,489,375 B2 | 12/2002 | Stone et al. | |
| 9,434,848 B1 * | 9/2016 | Breton | C09D 11/30 |
| 2005/0250875 A1 | 11/2005 | Marr et al. | |
| 2013/0310479 A1 * | 11/2013 | Lee | C09D 11/101 |
| | | | 522/18 |

* cited by examiner

*Primary Examiner* — Jessica E Whiteley
(74) *Attorney, Agent, or Firm* — Caesar Rivise, PC (57) ABSTRACT

This disclosure is directed to formulations for inks and methods for achieving those formulations for use in an emerging class of variable data digital lithographic image forming devices. Specific sub-system requirements that are unique to the emerging architecture caused an exploration of formula boundaries that, through experimentation, were determined to substantially reduce particle sizes for the color pigments enabling a higher latitude for ink image thickness. Experimentally-derived behavior in reducing particle size and adjusting rheological properties results when a inks are processed using a 3-roll mill with cooling employed. Inks demonstrated a preferably reduced preferred particle size distribution enabling a higher latitude for ink image thickness down to about 0.5 microns. Improved rheological profiles allow the inks to have higher zero-shear or static viscosity to be less runny and to allow more consistent flow into and through ink loaders and Anilox systems to a reimageable surface of an imaging member.

20 Claims, 6 Drawing Sheets

LOW TEMPERATURE MILLING OF INKS FOR IMPROVED PROPERTIES

BACKGROUND

1. Field of the Disclosed Embodiments

This disclosure relates to particular formulations for inks and particular methods for achieving those formulations for use in an emerging class of variable data digital lithographic image forming devices. Specific sub-system requirements that are unique to the emerging architecture caused an exploration of formula boundaries that, through experimentation, were determined to substantially reduce particle sizes for the color pigments enabling a higher latitude for ink image thickness. These ink formulations displayed improved rheological profiles allowing inks to have higher zero-shear or static viscosity making them less runny for use in the new class of variable data digital lithographic image forming devices.

2. Related Art

Lithographic and offset lithographic image forming are commonly understood printing methods for performing high quality multi-color images on a wide array of image receiving media substrates. For the purposes of this disclosure, the terms "printing," "marking" and "image forming" may be used interchangeably. In a typical lithographic image forming process, an image transfer surface, which may be in a form of a flat plate, a surface of a cylinder or drum, a surface of a belt or the like is patterned to include "image regions" generally of hydrophobic/oleophilic materials, and "non-image regions" generally of hydrophilic/oleophobic materials. The image regions correspond to the areas on the final print of an image formed on a target image receiving media substrate that are occupied by a marking material, such as ink, to form the images on the target substrate. The non-image regions correspond to the areas on the final print that are not occupied by the marking material. The hydrophilic regions accept, and are generally readily wetted by surface preparation fluids, which may include water-based fluids or other compound fluids, which may be commonly referred to as dampening fluids or fountain solutions. In embodiments, these dampening fluids conventionally consist of water and small amounts of alcohol and/or other additives and/or surfactants that are included to reduce surface tension of the fluids.

The hydrophobic regions of, for example, a printing plate tend to repel dampening fluid and accept ink, whereas the dampening fluid formed over the hydrophilic regions forms a fluid "release layer" for rejecting the adherence of ink on the imaging surface of the printing plate. The hydrophilic regions of the printing plate thus correspond to unprinted, or "non-image," areas of the final print.

In varying embodiments of conventional systems for lithographic image forming, the ink, as the marking material, may be transferred directly from the imaging surface to a target image receiving media substrate, such as paper or another substrate material at a pressure ink transfer nip. In offset lithographic image forming, the ink may be transferred from the imaging plate surface to an intermediate image transfer surface, such as an offset (or blanket) cylinder. Offset cylinders are often covered with conformable coatings or sleeves with surfaces that can conform to the texture of the imaging plate surface and the target image receiving media substrate, each of which may have, for example, a surface peak-to-valley depth somewhat different from the surface peak-to-valley depth of the other. Surface roughness or conformity of the offset (or blanket) cylinder helps to deliver a more uniform layer of the marking material, including ink, to the target image receiving media substrate free of defects such as mottle. Sufficient pressure is used to transfer the image directly from the imaging plate surface, or from the offset (or blanket) cylinder, to the target image receiving media substrate.

Typical lithographic and offset lithographic printing techniques employ plates that are permanently patterned, and are, therefore, useful for cost-effective image forming only when printing a large number of copies of the same image (i.e., for long print runs), such as magazines, newspapers, and the like. These techniques are not considered useful in creating and printing documents in which new patterns are generated from one page to the next without removing and replacing the print cylinder and/or the imaging plate. In this regard, conventional lithographic and offset lithographic printing techniques cannot accommodate true high-speed variable data printing in which the images may be changeable from impression to impression, for example, as in the case of what may be considered truly digital printing systems. Further, the cost of the permanently patterned imaging plates or cylinders is amortized over the number of copies. The cost per printed copy is, therefore, higher for shorter print runs of the same image than for longer print runs of the same image, as opposed to prints from digital printing systems. Additionally, because images do not change from impression to impression, ink transfer efficiency from the imaging plate surface to one or the other of the offset cylinder or target image receiving media substrate can be comparatively imprecise. Typical of these conventional systems are ink formulations which transfer, on average, as little as 50% of the ink deposited on the imaging plate surface.

SUMMARY OF THE DISCLOSED EMBODIMENTS

In view of the known shortfalls in conventional lithographic image forming with respect to efficient and/or cost effective variable data and/or digital lithographic image forming, a number of techniques have been attempted to implement high-speed digital lithographic printing.

U.S. Patent Application Publication No. 2012/0103212 A1 (the 212 Publication) published May 3, 2012, and based on U.S. patent application Ser. No. 13/095,714, which is commonly assigned and the disclosure of which is incorporated by reference herein in its entirety, proposes systems and methods for providing variable data lithographic and offset lithographic printing of image receiving media marking in an image forming system. The schemes disclosed in the 212 Publication are directed to improvements on various aspects of previously-attempted variable data lithographic marking concepts to achieve effective truly variable digital data lithographic printing.

According to the 212 Publication, a reimageable plate or plate-like surface is provided on an imaging member, which may be a drum, plate, belt or the like. The reimageable plate surface may be composed of, for example, silicones, including polydimethylsiloxane (PDMS) among others. Silicone and fluorosilicone elastomers are widely used in many applications, largely because they can be modified to optimum performance properties, particularly in a variety of marking applications. Desirable physical properties include release, thermal stability, thermal conductivity, hardness, and toughness. The reimageable plate surface of the imaging member may be formed of a relatively thin layer of such a material over a substantial mounting layer, a thickness of the relatively thin layer being selected to balance printing or marking performance with durability and manufacturability concerns and optimization of the stated properties, among others.

Figure 1:
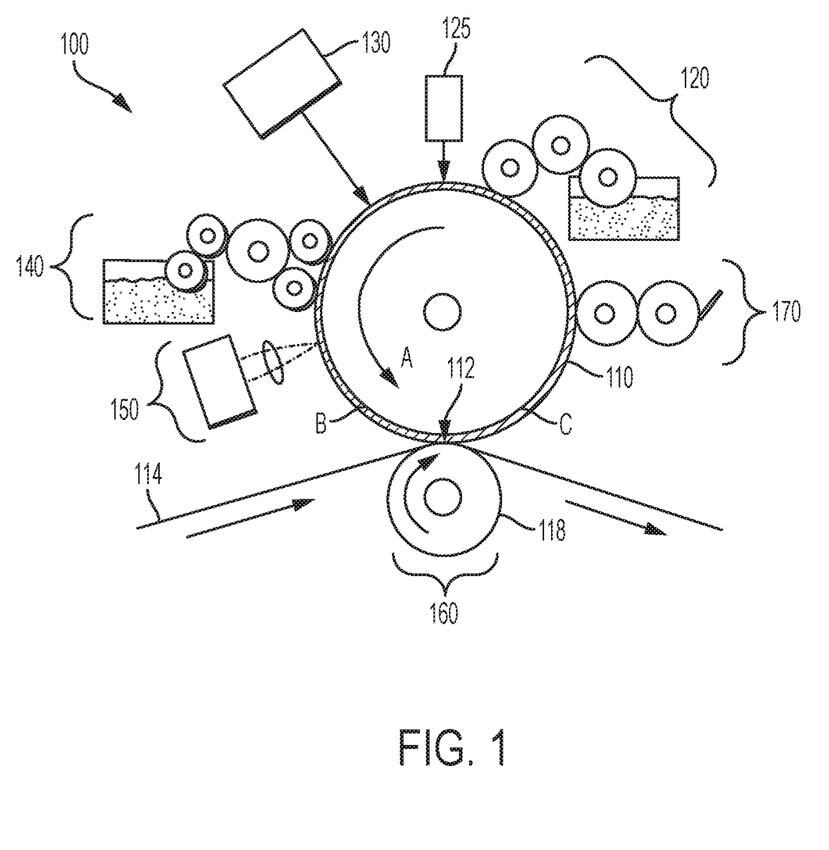
FIG. 1 schematically illustrates an exemplary embodiment of a variable data digital lithographic image forming device in which particularly-derived ink formulations according to this disclosure may be advantageously employed.

The 212 Publication describes an exemplary variable data lithography system 100 such as that shown, for example, in FIG. 1. A general description of the exemplary system 100 shown in FIG. 1 is provided here. Additional details regarding individual components and/or subsystems shown in the exemplary system 100 of FIG. 1, which provides a real-world utility for the disclosed material component, may be found in the 212 Publication.

As shown in FIG. 1, the exemplary system 100 may include an imaging member 110. The imaging member 110 in the embodiment shown in FIG. 1, although depicted as a drum, is not intended to imply that embodiments of such a device are necessarily restricted to containing a drum-type imaging member. The imaging member 110 in the exemplary system 100 is used to apply an inked image to a target image receiving media substrate 114 at a transfer nip 112. The transfer nip 112 is produced by an impression roller 118, as part of an image transfer mechanism 160, exerting pressure in the direction of the imaging member 110.

The exemplary system 100 may be used for producing images on a wide variety of image receiving media substrates 114. The 212 Publication explains the wide latitude of marking (printing) materials that may be used, including marking materials with pigment densities greater than 10% by weight. Increasing densities of the pigment materials suspended in solution to produce different color inks is generally understood to result in increased image quality and vibrance. These increased densities, however, often result in significant restriction, or even a complete preclusion, in the use of such inks in certain image forming applications that are conventionally used to facilitate variable data digital lithographic image forming, including, for example, jetted ink image forming applications. It is the desire to capture the enhanced image quality in a variable data digital lithographic image forming system that led to the development of the exemplary system 100 and ongoing extensive experimentation to achieve optimum results.

As noted above, the imaging member 110 may be comprised of a reimageable surface (layer or plate) formed over a structural mounting layer that may be, for example, a cylindrical core, or one or more structural layers over a cylindrical core. A dampening solution subsystem 120 may be provided generally comprising a series of rollers, which may be considered as dampening rollers or a dampening unit, for uniformly wetting the reimageable surface of the imaging member 110 with a layer of dampening fluid or fountain solution, generally having a uniform thickness. Once the dampening fluid or fountain solution is metered onto the reimageable surface, a thickness of the layer of dampening fluid or fountain solution may be measured using a sensor 125 that provides feedback to control the metering of the dampening fluid or fountain solution onto the reimageable surface.

An optical patterning subsystem 130 may be used to selectively form a latent image in the uniform dampening fluid layer by image-wise patterning the dampening fluid layer using, for example, laser energy. It is advantageous to form the reimageable surface of the imaging member 110 from materials that should ideally absorb most of the laser energy emitted from the optical patterning subsystem 130 close to the reimageable surface. Forming the reimageable surface of such materials may advantageously aid in substantially minimizing energy wasted in heating the dampening fluid and coincidentally minimizing lateral spreading of heat in order to maintain a high spatial resolution capability. The mechanics at work in the patterning process undertaken by the optical patterning subsystem 130 of the exemplary system 100 are described in detail with reference to FIG. 5 in the 212 Publication. Briefly, the application of optical patterning energy from the optical patterning subsystem 130 results in selective evaporation of portions of the uniform layer of dampening fluid in a manner that produces a latent image. As can be well understood, such selective evaporation requires a targeted application of comparatively intense optical energy resulting in a high degree of localized heating to temperature in excess of 300° F. in through the dampening fluid and at least in the reimageable surface.

The patterned layer of dampening fluid comprising a latent image over the reimageable surface of the imaging member 110 is then presented or introduced to an inker subsystem 140. The inker subsystem 140 is usable to apply a uniform layer of ink over the patterned layer of dampening fluid and the reimageable surface. In embodiments, the inker subsystem 140 may use an anilox roller to meter ink onto one or more ink forming rollers that are in contact with the reimageable surface. In other embodiments, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink deposited on the unformatted portions of the dampening fluid layer will not adhere to those portions.

Cohesiveness and viscosity of the ink residing on the reimageable surface may be modified by a number of mechanisms, including through the use of some manner of rheology control subsystem 150. In embodiments, the rheology control subsystem 150 may form a partial crosslinking core of the ink on the reimageable surface to, for example, increase ink cohesive strength relative to an adhesive strength between the ink and the reimageable surface. In embodiments, certain curing mechanisms may be employed, which may include, for example, optical or photo curing, heat curing, drying, or various forms of chemical curing. Cooling may be used to modify rheology of the transferred ink as well via multiple physical, mechanical or chemical cooling mechanisms.

Substrate marking occurs as the ink is transferred from the reimageable surface to a substrate of image receiving media 114 using the transfer subsystem 160. With the adhesion and/or cohesion of the ink having been modified by the rheology control system 150, the ink transfers substantially completely preferentially adhering to the substrate 114 as it separates from the reimageable surface at the transfer nip 112. Careful control of the temperature and pressure conditions at the transfer nip 112, combined with reality adjustment of the ink, may allow transfer efficiencies for the ink from the reimageable surface to the substrate 114 to exceed 95%. While it is possible that some dampening fluid may also wet substrate 114, the volume of such transferred dampening fluid will generally be minimal so as to rapidly evaporate or otherwise be absorbed by the substrate 114.

Finally, a cleaning system 170 is provided to remove residual products, including non-transferred residual ink and/or remaining dampening solution from the reimageable surface in a manner that is intended to prepare and condition the reimageable surface to repeat the above cycle for image transfer in variable data digital lithographic image forming operations in the exemplary system 100.

The reimageable surfaces of imaging members 110 must satisfy a range of often-competing requirements including (1) surface wetting and pinning the dampening fluid or fountain solution, (2) efficiently absorbing optical radiation from the laser or other optical patterning device, (3) wetting and pinning the ink in the discretely imaged areas of the reimageable surfaces, and (4) releasing the ink, preferably at efficiencies that exceed 95%. The ink release is controlled to promote the highest levels of ink transfer efficiency to the image receiving media substrate 114 to produce high quality images, limit waste, and minimize burden on downstream cleaning systems by yielding a substantially clean imaging surface at an exit of the transfer nip 112.

Reimageable surfaces of imaging members are formed of materials that, through extensive and ongoing experimentation, are determined to advantageously support the steps of the ink-based variable data digital lithographic printing process carried into effect according to systems such as those shown, in an exemplary manner, in FIG. 1. As mentioned above, such reimageable surfaces may be formed of, for example, silicone and fluorosilicone elastomers for the reasons noted above.

The proprietary variable data digital lithographic image forming process employing an image forming system substantially configured according to the example shown in FIG. 1 require offset type inks that are specifically designed and optimized to be compatible with the different subsystems, including, and particularly, ink delivery sub-system and imaging sub-system, to enable high quality digital lithographic printing at high speed.

An exploration of conventional ink formulations can only extend so far as the various competing requirements are balanced to achieve an "optimum" ink formulation, which to date has required acceptance of particular tradeoffs. Non-conventional ink production methods have been more broadly experimentally explored in order to reduce the tension between competing requirements. The offset inks that were initially employed as a starting point as the technology emerged and was refined suffered from one or more shortfalls including too low a static viscosity a rest in the ink loader at one end of the spectrum, or if static stability in the ink loader was realized, too high a viscosity of the same ink to be properly delivered from the ink loader into the Anilox system and from the Anilox system to the reimageable surface. It was determined that the narrow formulation design space yielded too narrow a latitude of performance of the ink in the architecture, which would need to be significantly broadened to promote usability of the new systems.

Extensive experimentation was undertaken with the recognition that the curable inks usable to support the variable data digital lithographic image forming process were required to meet specific sub-system requirements that are unique to architecture.

Exemplary embodiments of the systems and methods according to this disclosure broaden formulation boundaries of components by implementing an experimentally derived behavior deviation in the ink formulation process.

Exemplary embodiments reduce particle size of the solid pigment particles in the disclosed ink formulations and enhance rheological properties of the produced inks. In embodiments, a class of ink formulations is processed using a 3-roll mill to pulverize the ink pigment particles.

Exemplary embodiments facilitate additional particle size reductions by cooling the constituent elements during the pulverizing process. In embodiments, inks formulated according to the disclosed cooled pigment particle pulverizing processes resulted in a preferred particle size distribution enabling a higher latitude for ink image thickness, particularly a decrease in that thickness to a previously un achievable or substantially uncontrollable level on an order of a decrease to about 0.5 microns.

In embodiments, the produced ink formulations displayed improved rheological profiles allowing inks to have higher zero-shear or static viscosity making them less runny (a problem with some currently formulated inks).

In embodiments, the produced ink formulations exhibited a preferred viscosity range so as to allow the consistent, controllable flow into the ink loader and Anilox system and subsequent uniform out-transfer of inks from Anilox roller to the reimageable surface of the imaging member in the variable data digital lithographic image forming system.

The above, and other, features, and advantages, of the disclosed systems, methods and ink formulations are described in, or apparent from, the following detailed description of various exemplary embodiments.

BRIEF DESCRIPTION OF THE DRAWINGS

Various exemplary embodiments of the disclosed systems, methods and ink formulations for reducing pigment particle size in a resulting ink formulation to broaden an operating latitude for the ink formulations will be described, in detail, with reference to the following drawings, in which.

DETAILED DESCRIPTION

Exemplary embodiments are intended to cover alternatives, modifications, and equivalents as may be included within the spirit and scope of the compositions, methods, and systems described below.

The modifiers "about" and/or "substantially," when used in connection with any quantity or feature, are intended to be inclusive of any stated values and as having a meaning dictated by the context. For example, these modifiers may be used to include at least the degree of error associated with any measurement or feature that may be considered reasonable in the particular context. When used with a specific value, the use of the modifier "about" should also be considered as disclosing that specific value.

Reference is made to the drawing to accommodate understanding of an exemplary physical application of the disclosed inks for interaction with inking sub-systems, including Anilox roller inking sub-systems, and reimageable surfaces or other surfaces of imaging components in an image forming system, particularly an variable data digital lithographic image forming system, a configuration of which is shown by way of example in FIG. 1.

"Variable data digital lithographic image forming (or printing)" is a term directed to a unique class of image forming operations in which specialized reimageable surface configurations of imaging members are provided to effect lithographic image forming operations in which images are changeable/changed on each imaging cycle of the device system implementing the image forming scheme and/or as each inked image is formed and passed through a transfer nip to transfer the inked image from the reimageable surface to an image receiving media substrate, or to an intermediate transfer or offset component for further transfer to the image receiving media substrate. The digital lithographic image forming process, as described, requires particularly formulated material components, including special lithographic ink formulations to effect the variable data printing with images changing on every cycle of the system. These ink formulations, arrived at only through extensive experimentation, operated in harmony with the imaging surfaces, and the dampening fluids or fountain solutions to optimize lithographic printing of variable image data for producing images on individual image receiving media substrates in which the images are changeable with each subsequent rendering of the images on sequential substrates in the image forming process while minimizing adverse image quality effects, including ghosting, ink contamination effects, and ink waste through the promotion of exceptionally high levels of ink transfer from the imaging device components to the image receiving media. A variable data digital lithographic image forming system more broadly is a system that is configured for lithographic printing using specially-formulated lithographic inks and based on digital image data, which may be variable from one image to the next promoting ink transfer rates heretofore unachievable in conventional lithographic image forming, e.g., on an order of 90% or greater and, in cases, 95% or greater.

An imaging member surface, and particularly a reimageable surface of an imaging member, as discussed above, generally has a tailored topology, which may be a micro-roughened surface, structured to retain a uniform layer of dampening fluid in non-image areas following imaging of a deposited layer of the dampening fluid with an imaging device. Hillocks and pits that constitute the micro-roughened surface enhance the static or dynamic surface energy forces that may attract and "pin" the dampening fluid to the reimageable surface. This "pinning" reduces the tendency of the dampening fluid being forced away from the reimageable surface by roller or other pressure nip action at an ink transfer nip, for example.

The reimageable surface of the imaging member, as mentioned generally above, plays multiple roles in the variable data digital lithographic image forming process. These roles may include: (1) wetting the imaging surface with a uniform layer of dampening fluid, (2) pinning the uniform layer of dampening fluid with respect to the imaging surface, (3) creation of a latent image through image wise patterning of the uniform layer of dampening fluid based on efficient thermal absorption of light energy from an imaging source by the imaging surface, (4) wetting of the patterned (or latent image) with ink for temporary pinning of the ink to the imaged areas of the imaging surface, and (5) enabling substantially complete ink lift off and transfer from the imaging surface to an image receiving media substrate or intermediate transfer member, while retaining surface adhesion pinning of the patterned layer of dampening fluid.

During imaging on the reimageable surface, dampening fluid is removed and the reimageable surface itself is exposed to ink, the ink and dampening fluid constituting generally immiscible liquids or materials. As such, the reimageable surface should weakly adhere to the ink, yet be wettable with the ink, to promote uniform inking of image areas and subsequent transfer of the ink from the reimageable surface to the image receiving media substrate or intermediate transfer member. The optimization challenge that is among the objectives addressed by the below-claimed embodiments lies in formulating compositions of ink that promote a proper balance of adhesion and cohesion in the ink formulations to promote temporary pinning and ultimate releasing of the inks.

It is known that inks with too low a viscosity will crawl out of the an inker sub-system or ink loader and result in unwanted spills, loss of ink and potential contamination of other areas of the image forming device based on undesirable and uncontrollable ink migration. Lower viscosity inks at zero or low shear, such as from the effect of gravity, will result in a limited design latitude for the image forming system and placement of an inker subsystem in an exemplary image forming system such as that shown in FIG. 1. In fact, with reference to FIG. 1 depicting an exemplary, and potentially generally optimal design for the imaging system with minimal footprint considerations, consider the depiction as generally referring to a system for carrying into effect a printing process is based on a rotating cylinder imaging member on which the reimageable surface, as a transfer imaging plate, is situated. For lower viscosity inks, it becomes challenging or even impossible to contain ink in an ink loader that is situated, from the depiction in FIG. 1, at any position outside the arc between 7 o'clock ("B") and 5 o'clock ("C"), i.e., not in the preferred position with respect to the imaging member as generally depoicted.

The variable data digital lithographic image forming process generally involves the transfer of a pigmented ultra-violet (UV) curable ink onto the fluorosilicone printing plate constituting the reimageable surface in the manner generally described above, the reimageable surface having been partially coated with a release agent in the form of a dampening fluid or fountain solution, e.g. octamethylcyclotetrasiloxane (D4). The ink is then optionally partially cured using UV light and transferred from the reimageable surface to an image receiving media substrate, which may typically be constituted as a paper, plastic or metal, being printed. The ink, once transferred to the image receiving media substrate may be subjected to downstream finish curing by being exposed again to UV light for final curing at a processing station apart from the marking engine or image transfer component.

As is generally alluded to above and in order to the balance of requirements to support the variable data digital lithographic image forming process, the ink must possess many desirable physical and chemical properties. These include that the ink must be compatible with materials with which the ink is in contact, including the reimageable surface and the patterned layer of dampening fluid. The ink must also meet a particular set of functional requirements of the sub-systems including exhibiting acceptable wetting and coverage properties, and an adjusted rheology that promotes adhesion and cohesion characteristics that support ink transfer rates from the imaging system surfaces to the image receiving media substrates in excess of 95%.

The inks formulated for variable data digital lithographic image forming processes/applications are thus different in many ways from other inks developed for conventional printing applications, including conventional lithographic inks, conventional jettable inks, pigmented solid inks, UV-curable gel inks, and known ink formulations. What will be referred to general below, in instances, as "Digital Offset inks," while including pigment loading well below that found in conventional lithographic inks, contain much higher (up to 10 times) pigment loading, and therefore, have higher viscosity at room temperature, than others of the conventional inks usable for digital image forming according to other known mechanisms. Higher viscosities promote the desired levels of transfer efficiency among components and delivery as formed images on the substrates, but these advantages are balanced with disadvantages in introducing certain difficulties for anilox take-up and delivery to the reimageable surface. Also, the higher loading tend to result in thicker than desired ink layers for the formed images on the various substrate materials.

According to the disclosed embodiments, a variety of ink formulations and attendant process for ink formulation have been designed and tested with the rheology of inks typically being driven by formulation changes including varying the pigment loading and oligomer/monomer acrylate ratios.

Typical processing of inks on a 2- or 3-roll mill, without temperature control, yields predictable particle size reduction and rheology. Through extensive experimentation, it has been determined that cooling the rollers of the 3-roll mill during the formation of an ink, such as from a controlled low-temperature circulating bath, results in measurably significant further particle size reduction, and consequent improvement in a viscosity profile for the thus-formed inks. Control of these characteristics through the disclosed ink forming processes results in marked improvements in the overall latitude of the inks as they are varying carried to, and interacted among, the many sub-systems in the variable data digital lithographic image forming system architecture, including from the inker, or ink delivery, sub-system to the anilox roller, from the anilox roller to the reimageable surface, and from the reimageable surface in eventual transfer of ink from the reimageable surface to an image receiving media substrate, such as paper.

The disclosed schemes have been reduced to practice according to the following Examples of ink formulations.

Comparative Example 1

In a 1000 mL stainless steel beaker are added 232.0 g of an oligomer (in this Comparative Example (CE), a clear liquid tetrafunctional acrylated polyester oligomer—CN294E from Sartomer Corporation), 36.96 g of a monomer (in this CE, a propoxylated trimethylolpropane triacrylate fast curing monomer—SR501 from Sartomer Corporation), 21.0 g of a dispersant (in this CE, a 100% active polymeric dispersant—SOLSPERSE 39000 from The Lubrizol Corporation) and 4.0 g of a stabilizer (in this CE, a stabilizer for particular use in UV and/or electron beam (EB) curing formulations and that is soluble in substantially all acrylate formulations—CN3216 from Sartomer Corporation).

The vessel is placed on a heating mantle (in this CE a heating mantle available from IKA® equipped with a thermocouple and stirrer apparatus also available from IKA®), the vessel being equipped with an anchor impeller. The vessel was heated to 82° C. with the impeller stirring at approximately 100 RPM with gradually higher revolution speed being applied to approximately 500 RPM as the ink base components were heated up.

Into the vessel then was added 8.0 g of a first photoinitiator (in this CE, IRGACURE 379), 5.56 g of a second photoinitiator (in this CE, IRGACURE 819, both photoinitiators being from Sartomer USA, LLC), and 14.48 g of a third photoinitator (in this CE, ESACURE KIP 150, available from Lamberti S.p.A.). The resultant formulation was stirred at 500 RPM for 30 minute, at which time, 57.76 g of a first pigment component (C.I. Pigment Blue 15:3 from BASF—The Chemical Company) and 12.24 g of a second pigment component (C.I. Pigment Blue 15:3 from Clariant Corporation) were added slowly with the mixture to form a first pigmented formulation.

The first pigmented formulation was stirred for approximately an hour upon which 8.0 g of a modified montmorillonite (Claytone HY organoclay, available from Southern Clay Products) was added to form a second pigmented formulation that was then allowed to stir for another 30 minutes.

The vessel containing the mixed components of the second pigmented formulation was then transferred to a high speed shearing mill (in this CE, a shearing mill available from the Hockmeyer Equipment Corporation), equipped in this instance with a 40 mm diameter high shear Cowles blade, to stir the second pigmented formulation at 5300 RPM for approximately an hour to form Component Mixture 1A.

The thoroughly mixed component mixture was then qualitatively transferred to a 3-roll mill apparatus (in this CE, an apparatus manufactured by Kent Machine Works) where the Component Mixture 1A was passed through the 3-roll mill first at an input apron roll speed of approximately 500 RPM for the first pass, and then at an input apron roll speed of approximately 400 RPM for the second pass to form Component Mixture 1B. No attempt was made to control the temperature of the 3-roll mill. It was found that the ink on the feeding and apron rollers, owing to viscous and shearing forces, achieved temperatures of 27° C. and 38° C., respectively, as measured by an infrared red thermometer (in this CE, such a thermometer being available from Omega Engineering Inc).

Example 2

An ink was made in the same manner as in CE 1, except that cooling was employed to the 3-roll mill such that the temperatures of the feeding and apron rollers were 20° C. and 28° C., respectively, to form Component Mixture 2B after the second pass.

Example 3

An ink was made in the same manner as in CE 1, except that cooling was employed to the 3-roll mill such that the temperatures of the feeding and apron rollers were 14° C. and 23° C., respectively, to form Component Mixture 3B after the second pass.

Example 4

An ink was made in the same manner as in Example 3, except that an input apron roll speed of 200 RPM was used during the second pass of ink to form Component Mixture 4B after the second pass.

The following comparative characterizations of the CE and Example inks were observed.

Particle Size Measurements—Particle sizes of the inks were determined using a Zetasizer HT particle size analyzer available from Malvern Instruments, Ltd. Each of the inks were diluted to 50 ppm by weight in SARTOMER SR-501. Certain representative particle size metrics of the diluted inks are outlined below in Table 1.

TABLE 1

Particle Size Diameter Results of Inks

| Ink | 3-Roll Apron Roll Milling Input Speed, RPM | Feeding Roll Surface Temperature, °C. | Apron Roll Surface Temperature, °C. | Z-ave, nm | D10, nm | D50, nm | D90, nm |
|---|---|---|---|---|---|---|---|
| Comparative Example 1 | 400 | 27 | 38 | 431 | 339 | 445 | 592 |
| Example 2 | 400 | 20 | 28 | 210 | 143 | 222 | 374 |
| Example 3 | 400 | 14 | 23 | 313 | 219 | 329 | 499 |
| Example 4 | 200 | 14 | 23 | 251 | 165 | 263 | 435 |

The Z-ave refers to the harmonic intensity mean particle size diameter of a distribution of particle sizes, as thoroughly defined in ISO 13321 and ISO 22412. The percentiles, D10, D50 and D90 refer to the largest undersized diameters of particles in the 10th, 50th and 90th percentiles, respectively, in a distribution of particle size diameters.

Figure 2:
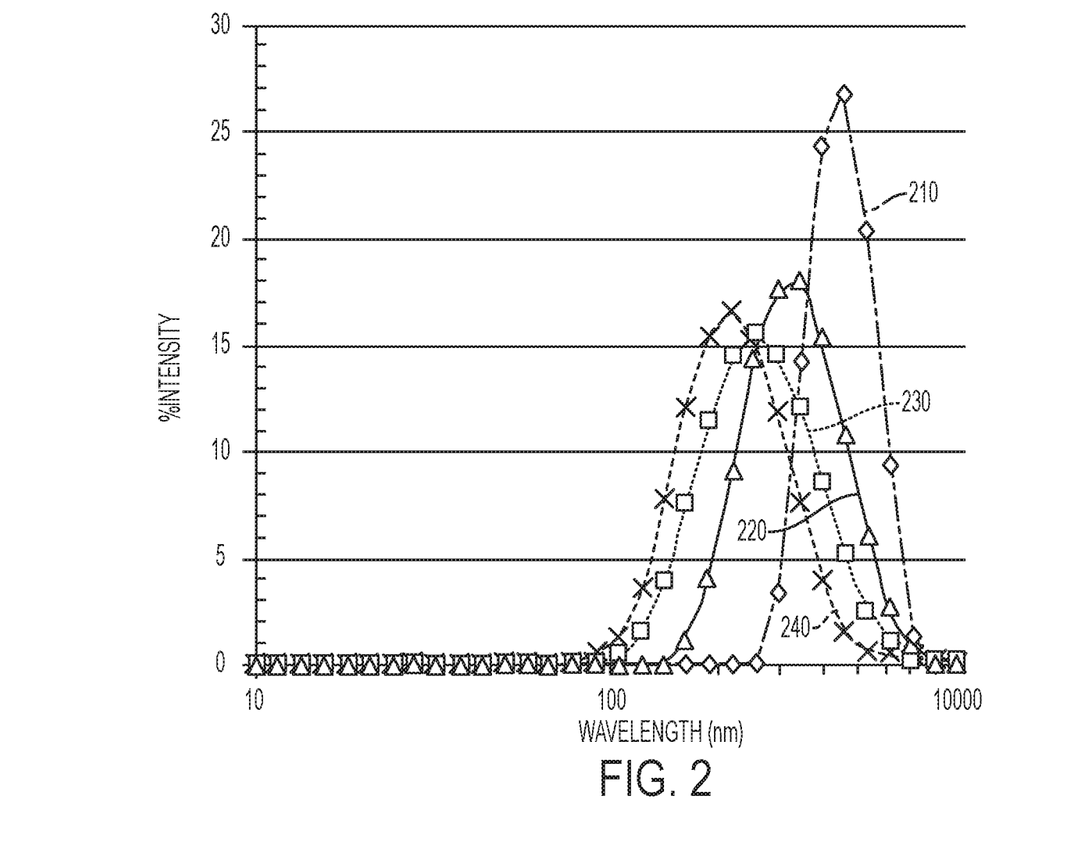
FIG. 2 graphically illustrates a comparison of an entire particle size distribution for various examples of ink formulations according to this disclosure and with respect to a Comparative Example for an ink by Intensity.
Figure 3:
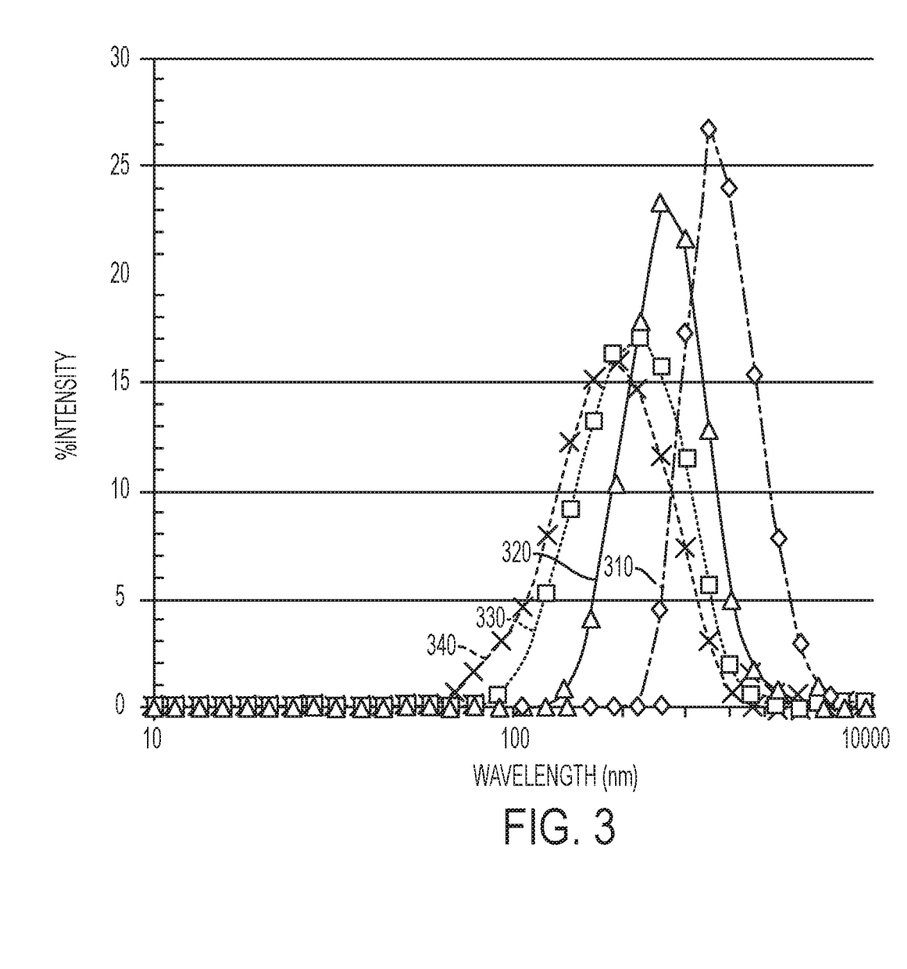
FIG. 3 graphically illustrates a comparison of an entire particle size distribution for various examples of ink formulations according to this disclosure and with respect to a Comparative Example for an ink by Number.

The experimentally-observed results in Table 1 indicated the dramatic decrease in particle size of the Example inks compared to the Comparative Example Ink. The substantial decreases in particle size not only occurred for Z-ave, which is extremely sensitive to larger primary and secondary particles, but importantly to the lower particle size percentiles, such as the D10 percentile where particle size in the D10 percentile decreased by an average of 48%. Thus, the entire particle size distribution of particles was notably affected and shifted in favor of smaller particle size. This comparison is graphically illustrated in the accompanying FIGS. 2 and 3, which compare the entire particle size distributions of the by intensity and number, respectively. Example 2 ink is depicted as Lines 230 and 330, respectively. Example 3 ink is depicted as Lines 220 and 320, respectively. Example 4 ink is depicted as Lines 240 and 340, respectively. Comparative Example 1 ink is depicted as Lines 210 and 310, respectively. FIGS. 2 and 3 reveal that the inks have well-defined particle size distributions evidenced by similarly symmetrical distributions in both intensity and number-derived data.

Figure 4:
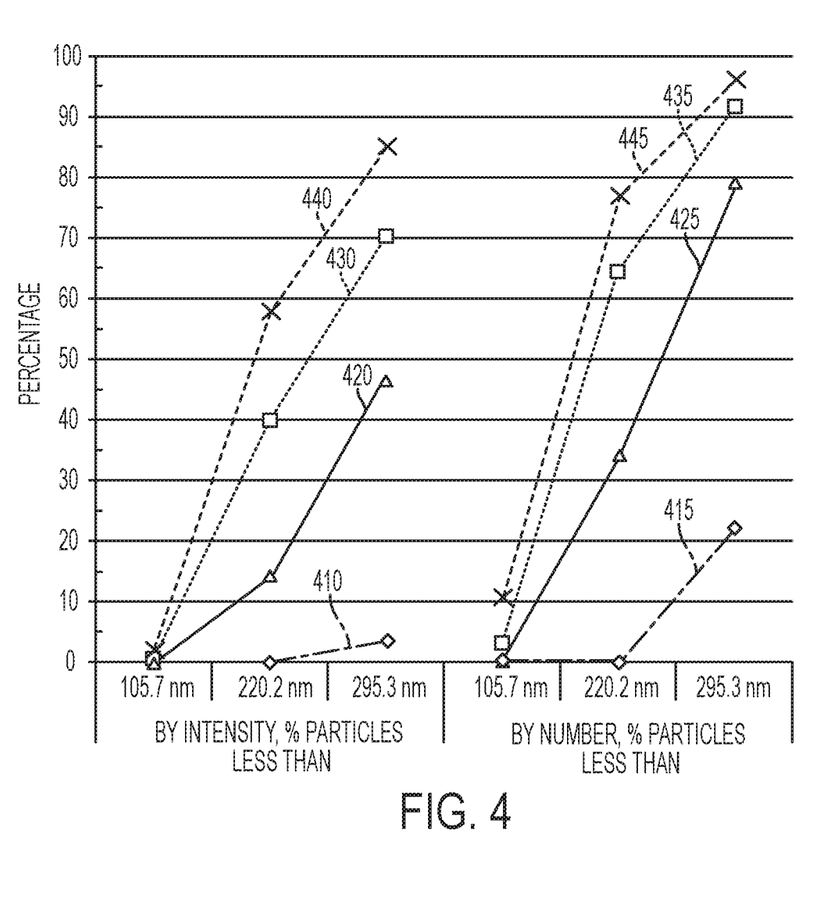
FIG. 4 graphically illustrates comparative benefits of a shift to smaller particle size distribution of inks when cooling is applied to mill rollers according to the particle processing methods of this disclosure.

The particle size distributions, both by intensity and number, show the tremendous shifting of particle size when cooling of the 3 roll mill is employed, the results of which are better summarized in both Table 2 and FIG. 4.

TABLE 2

Selected Distribution of Particles of Inks by Intensity and Number

| Ink | Temp. Milling Speed | By intensity, % Particles less than | | | By number, % Particles less than | | |
|---|---|---|---|---|---|---|---|
| | | 105.7 nm | 220.2 nm | 295.3 nm | 105.7 nm | 220.2 nm | 295.3 nm |
| Comparative Example 1 | 27° C. 400 RPM | 0.0 | 0.0 | 3.4 | 0.0 | 0.0 | 22.1 |
| Example 2 | 20° C. 400 RPM | 0.4 | 39.8 | 70.1 | 2.9 | 64.2 | 91.6 |
| Example 3 | 14° C. 400 RPM | 0.0 | 14.6 | 46.6 | 0.0 | 34.0 | 79.1 |
| Example 4 | 14° C. 400 RPM | 2.1 | 58.0 | 85.1 | 10.8 | 77.1 | 96.1 |

From the data in Table 2, and in the case of the Comparative Example ink, none of the particles are measured to be smaller than 220 nm, either by derived intensity or number, in great contrast to the Example inks made by 3-roll milling with applied cooling.

In like manner, FIG. 4 graphically illustrates the tremendous benefits of preferred shift to smaller particle size distribution of inks when cooling is applied to 3-roll mill rollers. It is very desirable that the substantial portion of the particle diameters of the particles in the ink is greater than about 100 nm and less than about 300 nm. FIG. 4 generally graphically replicates data from Table 2. Example 2 ink is depicted as Lines 430 and 435, respectively. Example 3 ink is depicted as Lines 420 and 425, respectively. Example 4 ink is depicted as Lines 440 and 445, respectively. Comparative Example 1 ink is depicted as Lines 410 and 415, respectively.

The cooling of the 3-roll mill rollers in the ink formation process achieves two substantial purposes: 1) the ink yields greater latitude in the thickness of the image being printed resulting in better uniformity at thinner image layers, for instance as low as about 0.5 um thickness image layer owing to the absence of a significant portion of particles greater than about 300 nm, and 2) the absence of a significant portion of smaller particles less than about 100 nm, which enables better curing potential of the image. The first advantage also results in an additional benefit in increased latitude of fountain solution thickness (for instance, D4) where even thinner D4 layers can be applied to the blanket in correspondence to the thinner ink layers in variable data digital lithographic image forming cycle.

Rheology Measurements—Frequency-based sweep rheologies, between applied 0.1 and 100 rad/s frequencies, of all inks are determined on a RFS-3 rheometer (in this instance, available from Rheometrics Scientific (now TA Instruments)) at 25° C. equipped with a 25 mm plate at 0.5 mm gap. The rheology results of the inks can be found in Table 3.

TABLE 3

Rheology Results of Inks at 35° C.

| Ink | 3-Roll Apron Roll Milling Input Speed, RPM | Feeding Roll Surface Temperature, ° C. | Apron Roll Surface Temperature, ° C. | Complex Viscosity (mPa · s) @ 0.1 rad/s | Complex Viscosity (mPa · s) @ 100 rad/s | Viscosity Ratio ($\eta_{0.1}/\eta_{100}$) | Elastic Modulus, G' (Pa) @ 0.1 rad/s | Elastic Modulus, G' (Pa) @ 100 rad/s |
|---|---|---|---|---|---|---|---|---|
| Comparative Example 1 | 400 | 27 | 38 | 2.63E+06 | 8.13E+04 | 32.4 | 214 | 3963 |
| Example 2 | 400 | 20 | 28 | 3.52E+06 | 7.75E+04 | 45.5 | 300 | 4064 |
| Example 3 | 400 | 14 | 23 | 4.56E+06 | 7.76E+04 | 58.8 | 401 | 4468 |
| Example 4 | 200 | 14 | 23 | 3.98E+06 | 7.62E+04 | 52.3 | 343 | 4120 |

The rheology results in Table 3 show the unexpected effect and benefits of milling inks where there was cooling applied to the 3-roll mill. Very preferably, the very low frequency viscosity values, for example, signified by viscosities at 0.1 rad/s, of the Example inks were significantly higher than that of the Comparative Example ink. Also importantly, the higher frequency viscosity values, for example signified by viscosities at 100 rad/s, of the Example inks were very similar to those of the Comparative Example ink. This improved viscosity profile of the Example inks, referred to herein as the Viscosity Ratio, (the ratio of viscosities at 0.1 and 100 rad/s or $\eta_{0.1}/\eta_{100}$) results in a stiffer ink at low applied frequency and shear, and yet affords the inks to flow with the same efficiency as the Comparative Example ink at higher applied frequencies and shear.

This is analogous to a situation in an image forming system architecture where an ink is required to have a certain stiffness and viscosity to avoid unnecessary ink run-off and drip having negative implications for the undertaken image forming operation, but display a suitable viscosity and therefore flow into the transferring member of the inker sub-system or ink loader such as an anilox roller. Higher viscosity inks at very low applied frequency or shear also typically have lower odor as the sources of the odor, mainly from the monomer component(s) are better contained in the higher viscosity ink matrix.

Figure 5:
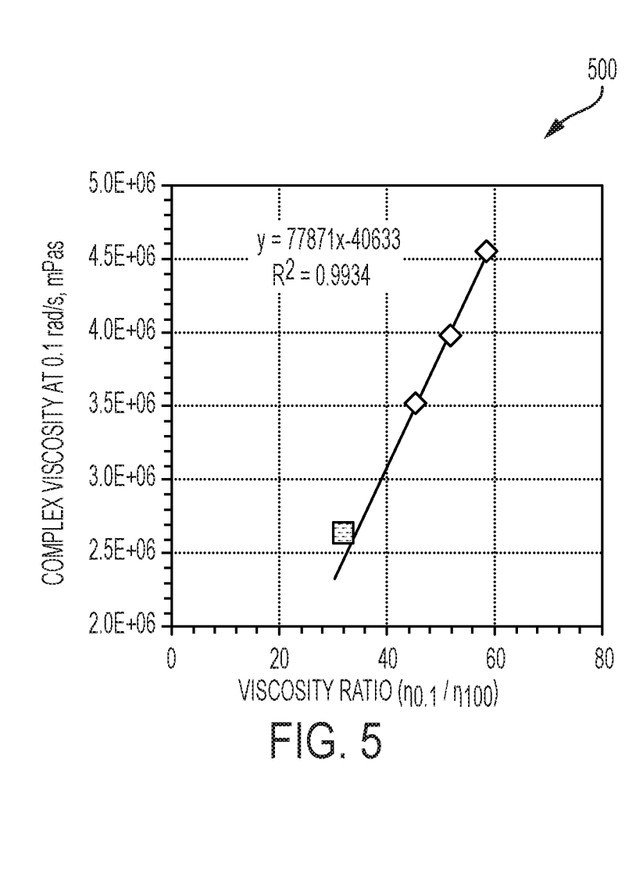
FIG. 5 graphically illustrates a first-order relationship between complex viscosity at very low applied frequency.

FIG. 5 graphically illustrates what may be considered to be a fairly predictable first-order relationship between the complex viscosity at very low applied frequency, in this case 0.1 rad/s and a Viscosity Ratio alluding to the more or less constancy of viscosity at higher applied frequency, in this case 100 rad/s. See graph 500 in which the diamonds depict points in which the 3 roll mill was cooled and the square depicts the result of no cooling of the 3-roll mill. The first order model regression fit (line) of the inks made with cooling of the 3-roll mill rollers predict within 6% the corresponding Viscosity Ratio of the Comparative Example ink made with no cooling. In fact, the coefficient of determination of the linear regression of the plot in FIG. 5 marginally changes from 0.9934 to 0.9963 when the Comparative Example ink is included. This shows that the relationship between complex viscosity and Viscosity Ratio is independent of how the inks were made, at least within the context and scope of their preparation according to this disclosure.

Figure 6:
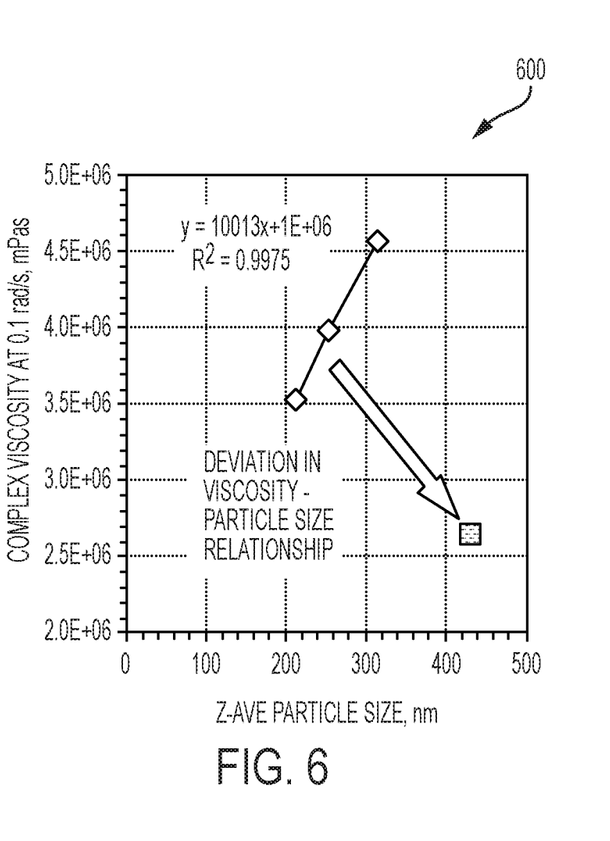
FIG. 6 graphically illustrates a relationship between complex viscosity at 0.1 rad/s and Z-ave particle size.

FIG. 6 graphically illustrates the relationship between complex viscosity at 0.1 rad/s and Z-ave particle size. See graph 600 in which the diamonds depict points in which the 3-roll mill was cooled and the square depicts the result of no cooling of the 3-roll mill. In contrast to the above relationship illustrated in FIG. 5, FIG. 6 shows the deviating behavior of the Example inks made by 3-roll milling with applied cooling compared to the Comparative Example ink made without 3-roll mill cooling. Particularly, as shown in FIG. 6, there is a substantial shift in the relationship of low frequency complex viscosity and Z-ave particle size between the Example inks and the Comparative Example ink alluding to a different structure that is formed from inks made by 3-roll mill with applied cooling.

Figure 7:
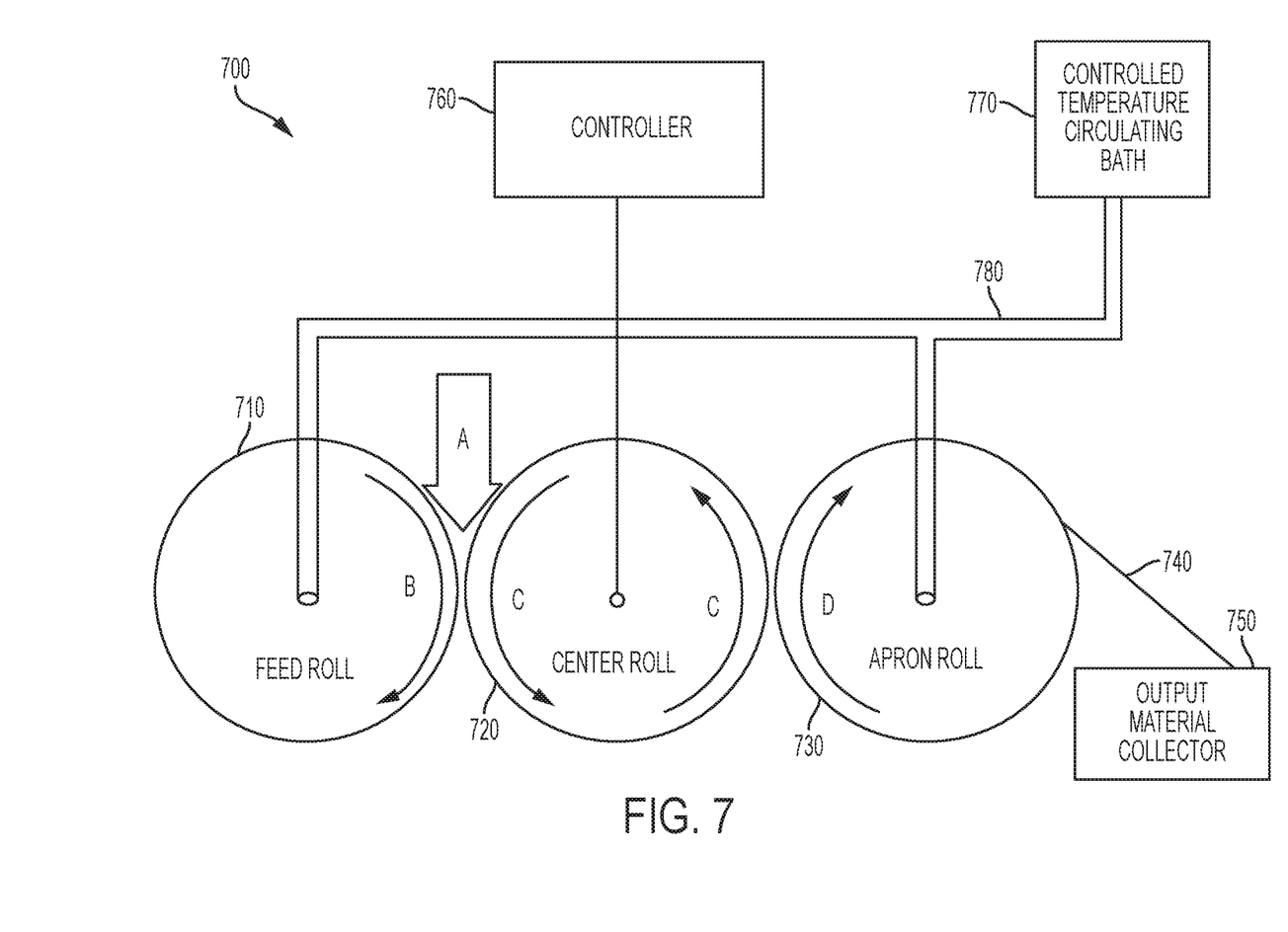
FIG. 7 illustrates a schematic diagram of a typically configured 3-roll mill that may be adapted for use in formulating ink products according to this disclosure.

FIG. 7 illustrates a schematic diagram of a typically configured 3-roll mill 700 that may be adapted for use in formulating ink products according to this disclosure. As shown in FIG. 7, three adjacent rolls are typically provided, which are commonly referred as the feed roll 710, the center roll 720 and the apron roll 730. The separate rolls 710, 720, 730, rotate at progressively higher speeds in directions B, C and D as indicated under the control of a controller 760.

Material, usually in a form of a paste, is fed between the feed roll 710 and the center roll 720 via an input port substantially in direction A as shown. Due to the narrowing space between the rolls 710, 720, 730, most of the paste initially remains in the feed region. The part that makes it through the first in-running nip experiences very high shear force due to the different rotation speeds of the two rolls. Upon exiting, the material that remains on the center roll 720 moves through the second nip between the center roll 720 and the apron roll 730. This subjects the material to an even higher shear force, due to the higher speed of the apron roll 730 and typically, a smaller gap between the center roll 720 and the apron roll 730 than between the feed roll 710 and the center roll 720.

A knife blade 740 or other like device may be positioned substantially as shown to scrape the processed material off the apron roll 730 and the paste rolls down the apron to an output material collector 750. This milling cycle can be repeated several times to maximize material dispersion. In subsequent cycles, the controller 760 may increase the speeds and or modify the differential speeds of the rolls 710,720,730.

In certain configurations of typical 3-roll mills the gaps between the rolls 710,720,730 can be mechanically or hydraulically adjusted and maintained. Typically, the gap distance is somewhat greater than the particle size. In some operations, the gap distance is gradually decreased to achieve the desired level of dispersion. Typically, the rolls may be internally cooled such as being water-cooled. In the processing systems according to this disclosure a controlled temperature circulating bath 770 and any associated piping 780 may be provided in order to maintain the cooling levels described above for the individual rolls under control of the controller 760.

Exemplary embodiments of ink formulations processed according to this disclosure, i.e., by cooling the rollers of a pulverizer or 3-roll mill in the ink formulation process, result in previously unachievable reductions in particle size as compared to non-cooled, conventional ink milling. These particle size reductions yield substantial advantages that are particularly relevant to the ink formulations used in variable data digital lithographic image forming with systems that may include the components shown in FIG. 1 above. The substantial advantages include, among others:

1) Increased latitude of print film thickness yielding ultimately thinner ink thickness and better uniformity owing to smaller particle size of inks;

2) Controlled particle size distribution of ink particles between approximately 100 nm and approximately 300 nm (by intensity and number), thereby enabling optimum optical density without interfering with radiation cure as in the case with inks having too small a particle size;

3) Improved latitude in ink loader design owing to inks having higher Viscosity Ratios;

4) Lower odor due to inks having higher Viscosity Ratios;

5) Retention of compatibility with fountain solution and reimageable surface materials used for variable data digital lithographic image forming (improvement from physical process to make ink in contrast to formulating);

6) Increased fountain solution (such as D4) latitude allowing thinner fountain solution layers on the reimageable surface to be employed; and 7) Suitability for the improved image quality produced by and through the variable data digital lithographic image forming process.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. An ink composition useful for variable data digital lithographic printing, comprising:
    an acrylate ink base formulation;
    a pigment component; and
    a clay component,
    a slurry material comprising the acrylate ink base formulation, the pigment component, and the clay component;
    wherein the acrylate ink base formulation, the pigment component, and the clay component are pulverized in a roll mill while at least one roll in the roll mill is actively cooled when processing the slurry material;
    wherein the pulverizing renders an ink composition comprising ink particles with diameters in a range of 300 nm or less.

2. The ink composition of claim 1, the acrylate ink base formulation comprising:
    at least one of an acrylate monomer, oligomer or polymer, or a mixture thereof.

3. The ink composition of claim 2, the acrylate ink base formulation further comprising:
    a rheology modifying agent; and
    a stabilizing agent.

4. The ink composition of claim 3, further comprising at least one photoinitiator component.

5. The ink composition of claim 1, the diameters of the ink particles being in a range of 100 nm to 300 nm.

6. The ink composition of claim 1, the roll mill being a 3-roll mill comprising a feed roller at an input side, an apron roller at an output side and a center roller sandwiched between the feed roller and the apron roller,
    each of the feed roller and the apron roller achieving a respective standard operating temperature in a pulverizing processing of a slurry material,
    each of the feed roller and the apron roller being separately actively cooled to reduce a temperature of the respective each of the feed roller and the apron roller during the pulverizing.

7. The ink composition of claim 6, the temperature of the feed roller being reduced by more than 6 degrees C. under the respective standard operating temperature for the feed roller.

8. The ink composition of claim 6, the temperature of the feed roller being reduced by more than 12 degrees C. under the respective standard operating temperature for the feed roller.

9. The ink composition of claim 6, the temperature of the apron roller being reduced by 10 degrees C. or more under the respective standard operating temperature for the apron roller.

10. The ink composition of claim 6, the temperature of the apron roller being reduced by 15 degrees C. or more under the respective standard operating temperature for the apron roller.

11. A method for preparing an ink composition for use in digital printing, comprising:
    preparing an acrylate ink base formulation;
    dispersing at least a pigment component and a clay component in the acrylate ink base formulation to produce pigmented ink slurry;
    pulverizing the slurry in a roll mill while at least one roll in the roll mill is actively cooled to reduce a temperature of the at least one roll during the pulverizing rendering ink particles with diameters in a range of 300 nm or less.

12. The method of claim 11, the acrylate ink base formulation comprising:
    at least one of an acrylate monomer, oligomer or polymer, or a mixture thereof.

13. The method of claim 12, the acrylate ink base formulation further comprising:
    a rheology modifying agent; and
    a stabilizing agent.

14. The method of claim 13, the slurry further comprising at least one photoinitiator component.

15. The method of claim 11, the diameters of the ink particles being in a range of 100 nm to 300 nm.

16. The method of claim 11, the roll mill being a 3-roll mill comprising a feed roller at an input side, an apron roller at an output side and a center roller sandwiched between the feed roller and the apron roller,
 each of the feed roller and the apron roller achieving a respective standard operating temperature in a pulverizing processing of a slurry material,
 the method further comprising actively cooling each of the feed roller and the apron roller separately to reduce a temperature of the respective each of the feed roller and the apron roller during the pulverizing.

17. The method of claim 16, further comprising reducing the temperature of the feed roller by more than 6 degrees C. under the respective standard operating temperature for the feed roller.

18. The method of claim 16, further comprising reducing the temperature of the feed roller y more than 12 degrees C. under the respective standard operating temperature for the feed roller.

19. The method of claim 16, further comprising reducing the temperature of the apron roller by 10 degrees C. or more under the respective standard operating temperature for the apron roller.

20. The method of claim 16, further comprising reducing the temperature of the apron roller by 15 degrees C. or more under the respective standard operating temperature for the apron roller.

* * * * *